No. 854,529. PATENTED MAY 21, 1907.
B. F. REICHENBERGER.
CLUTCH.
APPLICATION FILED MAY 4, 1906.
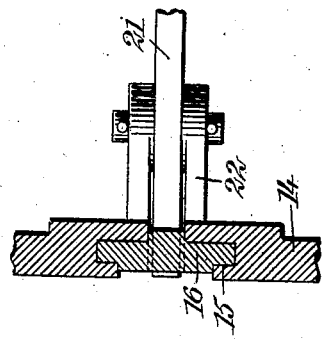
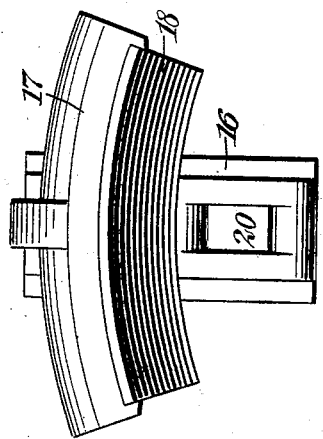
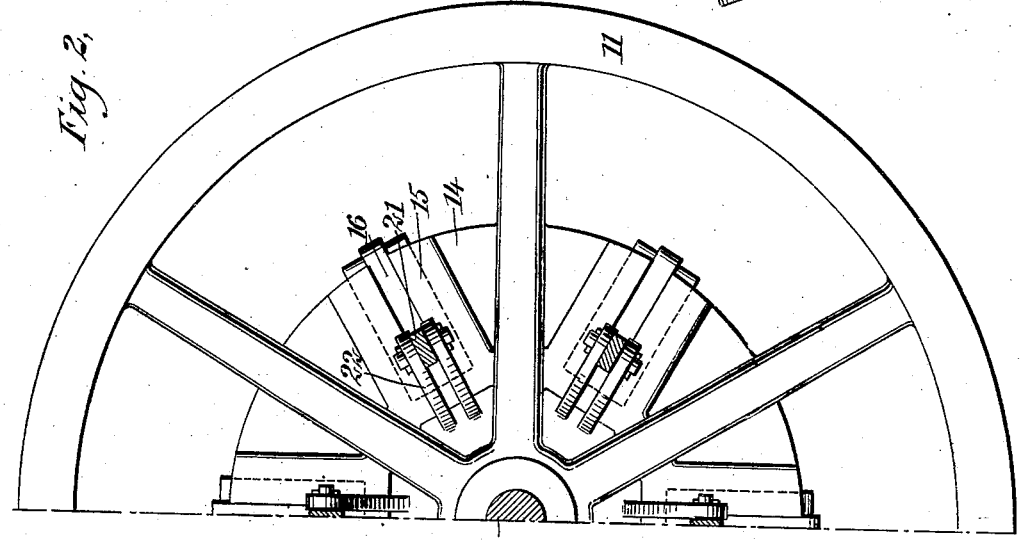
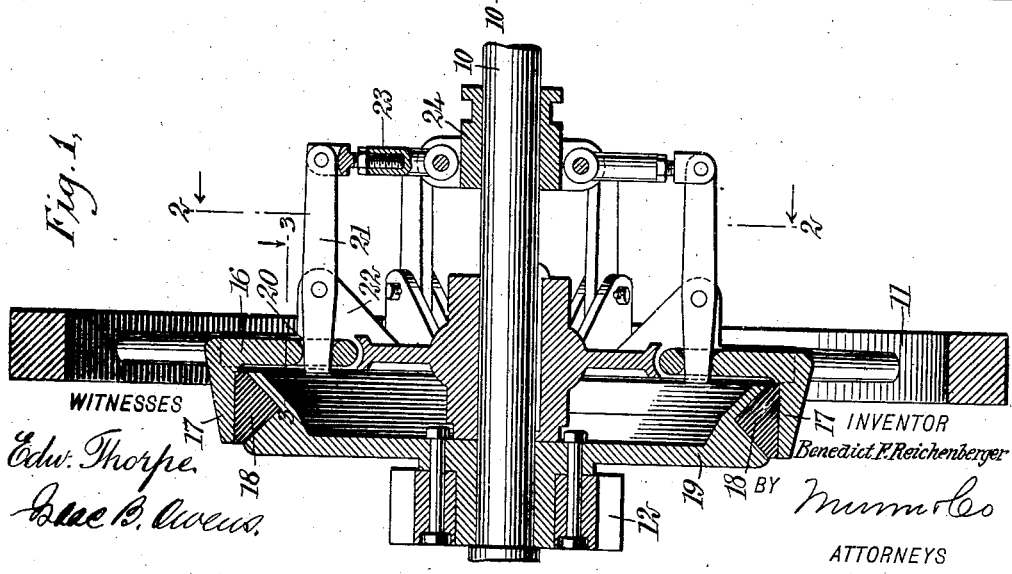
WITNESSES
Edw. Thorpe
Isaac B. Owens
INVENTOR
Benedict F. Reichenberger
BY
Munn & Co
ATTORNEYS

UNITED STATES PATENT OFFICE.

BENEDICT F. REICHENBERGER, OF TOWNSHIP 4, BROWN COUNTY, KANSAS.

CLUTCH.

No. 854,529.   Specification of Letters Patent.   Patented May 21, 1907.

Application filed May 4, 1906. Serial No. 315,142.

*To all whom it may concern:*

Be it known that I, BENEDICT F. REICHENBERGER, a citizen of the United States, and a resident of section 25, township 4, range 18, county of Brown, and State of Kansas, have invented a new and Improved Clutch, of which the following is a full, clear, and exact description.

The invention relates to a clutch for connecting rotating elements. It is useful in connection with various branches of mechanical arts, but is especially intended for application to the crank shaft and fly wheel of traction engines.

The invention resides in certain special features of construction, as will be fully set forth hereinafter and particularly pointed out in the claims.

Reference is to be had to the accompanying drawings which illustrate as an example the preferred embodiment of my invention, in which drawings Figure 1 is a sectional view of the invention; Fig. 2 is a partial elevation thereof, with the actuating levers in section, on the line 2—2 of Fig. 1; Fig. 3 is a detail section, on the line 3—3 of Fig. 1; and Fig. 4 is a detail view of one of the clutch shoes.

10 indicates the drive shaft, which may be the crank shaft of an engine or shaft of any other machine and 11 indicates a fly wheel which, according to the construction here shown, is fastened on the shaft 10.

12 indicates the driven member which is loose on the shaft 10, and is here shown in the form of a gear although any other element may be used instead.

The fly wheel or other element 11 has a web 14, and in this web guides 15 are constructed. Said guides carry slides 16 which have clutch shoes 17 fastened thereto. Said shoes are preferably faced with friction blocks 18, as shown, and said blocks engage the grooved periphery of the disk 19 which is fastened to the driven member 12. When the slides 16 are moved inward the shoes 18 engage the disk 19, and firmly connect the disk with the wheel 11, and since this wheel is connected to the drive shaft 10, all of the parts of the clutch turn in unison.

The slides 16 are formed with openings 20 therein, and in these openings are received the actuating levers 21. Said levers are fulcrumed between lugs 22 formed on the web 14, and the outer ends of the levers are connected with adjustable links 23 which are in turn joined to a sliding collar 24 mounted on the shaft 10. Said collar 24 is adapted to be in connection with an operating lever of any desired form. The levers 21, links 23 and collar 24 rotate with the wheel 11, shaft 10 and clutch shoes, and by sliding the collar on the shaft the levers are caused to move the clutch shoes in or out of engagement with the disk 19 so as to control the action of the clutch at will.

Having thus described the preferred form of my invention, what I actually claim and desire to secure by Letters Patent is:

In a clutch, the combination with a shaft, of a wheel keyed thereto, and provided with a web between the spokes thereof, said web having at spaced intervals guides arranged radially to the shaft, slides movable in the guides and provided with clutch shoes, said slides having openings therethrough, a wheel loosely mounted on the shaft and having connected therewith a disk provided with a groove on its periphery for coöperating with the clutch shoes, a spaced pair of outwardly projecting lugs on the web adjacent to each of the guides a lever pivoted to each pair of lugs and having one end engaged in the opening of the adjacent slide, a collar slidably mounted on the shaft, and an adjustable connection between the free end of each member and the collar.

In testimony whereof I have signed my name to this specification in the presence of two subscribing witnesses.

BENEDICT F. REICHENBERGER.

Witnesses:
W. E. ENGLISH,
JOHN L. SNAVELY.